(12) United States Patent
Watanabe et al.

(10) Patent No.: US 10,442,470 B2
(45) Date of Patent: Oct. 15, 2019

(54) VEHICLE SIDE STRUCTURE

(71) Applicant: HONDA MOTOR CO., LTD., Tokyo (JP)

(72) Inventors: Masato Watanabe, Wako (JP); Taiga Marukawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/995,616

(22) Filed: Jun. 1, 2018

(65) Prior Publication Data

US 2018/0346033 A1 Dec. 6, 2018

(30) Foreign Application Priority Data

Jun. 5, 2017 (JP) ................. 2017-111206

(51) Int. Cl.
| | |
|---|---|
| *B62D 25/02* | (2006.01) |
| *B62D 25/20* | (2006.01) |
| *B60J 10/84* | (2016.01) |
| *B60R 13/04* | (2006.01) |
| *B62D 25/04* | (2006.01) |

(52) U.S. Cl.
CPC ............ *B62D 25/025* (2013.01); *B60J 10/84* (2016.02); *B60R 13/04* (2013.01); *B62D 25/2036* (2013.01); *B62D 25/04* (2013.01)

(58) Field of Classification Search
CPC ............................. B62D 25/025; B60R 13/04
USPC .................................................. 296/209, 1.08
See application file for complete search history.

(56) References Cited

U.S. PATENT DOCUMENTS

| | | |
|---|---|---|
| 2010/0207428 A1 | 8/2010 | Fukushima |
| 2011/0025085 A1 | 2/2011 | Kubo |
| 2018/0086188 A1 | 3/2018 | Tamao et al. |

FOREIGN PATENT DOCUMENTS

| | | |
|---|---|---|
| JP | 2010-188802 A | 9/2010 |
| JP | 2011-031651 A | 2/2011 |
| JP | 2017-210065 A | 11/2017 |
| JP | 2018-052362 A | 4/2018 |

OTHER PUBLICATIONS

Japanese Decision to Grant a Patent dated Jan. 16, 2019, English abstract included, 6 pages.

*Primary Examiner* — Dennis H Pedder
(74) *Attorney, Agent, or Firm* — Rankin, Hill & Clark LLP

(57) ABSTRACT

A vehicle side structure has: a front door and a rear door; a side sill that is arranged under the front door and the rear door; a side sill garnish that is fixed to the side sill; and a molding member that is arranged between lower ends of the front door and the rear door and an upper end of the side sill garnish, and that protrudes more outside in a lateral direction than the lower ends of the front door and the rear door. The molding member includes: a front door lower portion; a rear door lower portion; and a center pillar outer portion that is arranged outside in the lateral direction of a lower portion of the center pillar. The front door lower portion and the rear door lower portion are recessed more inside in the lateral direction than the center pillar outer portion.

9 Claims, 10 Drawing Sheets

“VEHICLE SIDE STRUCTURE

CROSS REFERENCE TO RELATED APPLICATION

This application claims the benefit of priority to Japanese Patent Application No. 2017-111206 filed on Jun. 5, 2017, the disclosures of all of which are hereby incorporated by reference in their entireties.

FIELD OF THE INVENTION

The present invention relates to a vehicle side structure.

BACKGROUND ART

Conventionally, a vehicle side structure of an automobile is known, in which, for example, side sills are protruded outward in a lateral direction, to protect doors from chippings due to collision by pebbles or the like, which are thrown up by front wheels (for example, see Japanese Patent Application Publication No. 2010-188802).

In the vehicle side structure described in the above-referenced publication, each side sill is reinforced by a reinforcing member in a plate shape having a joined portion to be joined to the lower end of an outer side sill and a protrusion that protrudes outward in the lateral direction from the joined portion.

SUMMARY OF THE INVENTION

However, in the vehicle side structure described in the above-referenced publication, the side sill itself is extremely protruded outward in the lateral direction, and therefore, when occupants get in and out of a vehicle, legs of the occupants may be caught by the protrusions. This may cause a difficulty for the occupants at the time of getting in and out of the vehicle.

Further, in the vehicle side structure described in the above-referenced publication, the side sills are molded with steel plates. Therefore, if the shape of the side sills is changed for protection from chippings, molding accuracy needs to be increased.

The present invention solves the problems above and provides a vehicle side structure that prevents damage due to chipping while allowing occupants to easily get in and out of a vehicle.

In order to solve the above problem, a vehicle side structure has: a front door and a rear door that are arranged on both sides in a longitudinal direction of a center pillar; a side sill that is arranged under the front door and the rear door; a side sill garnish that is fixed to the side sill; and a molding member that is arranged between lower ends of the front door and the rear door and an upper end of the side sill garnish, and that protrudes more outside in a lateral direction than lower ends of the front door and the rear door. The molding member includes: a front door lower portion that is arranged under a front portion of the front door; a rear door lower portion that is arranged under a rear portion of the rear door; and a center pillar outer portion that is arranged outside in the lateral direction of a lower portion of the center pillar. The front door lower portion and the rear door lower portion are recessed more inside in the lateral direction than the center pillar outer portion.

The present invention provides a vehicle side structure that prevents damage from chippings while allowing occupants to easily get in and out of a vehicle.

DETAILED DESCRIPTION OF THE INVENTION

A description will be given of an exemplary vehicle side structure according to an embodiment of the present invention, with reference to the accompanying drawings.

In the embodiment, a "front" and a "rear" respectively indicate a front side and a rear side of a vehicle, an "upper" and a "lower" respectively indicate an upper side and a lower side in a vertical direction, and a "right and left" indicates a vehicle width (lateral) direction.

<<Vehicle>>

A vehicle V having a vehicle side structure A will be firstly described, and then, the vehicle side structure A according to an embodiment of the present invention will be described.

Figure 1:
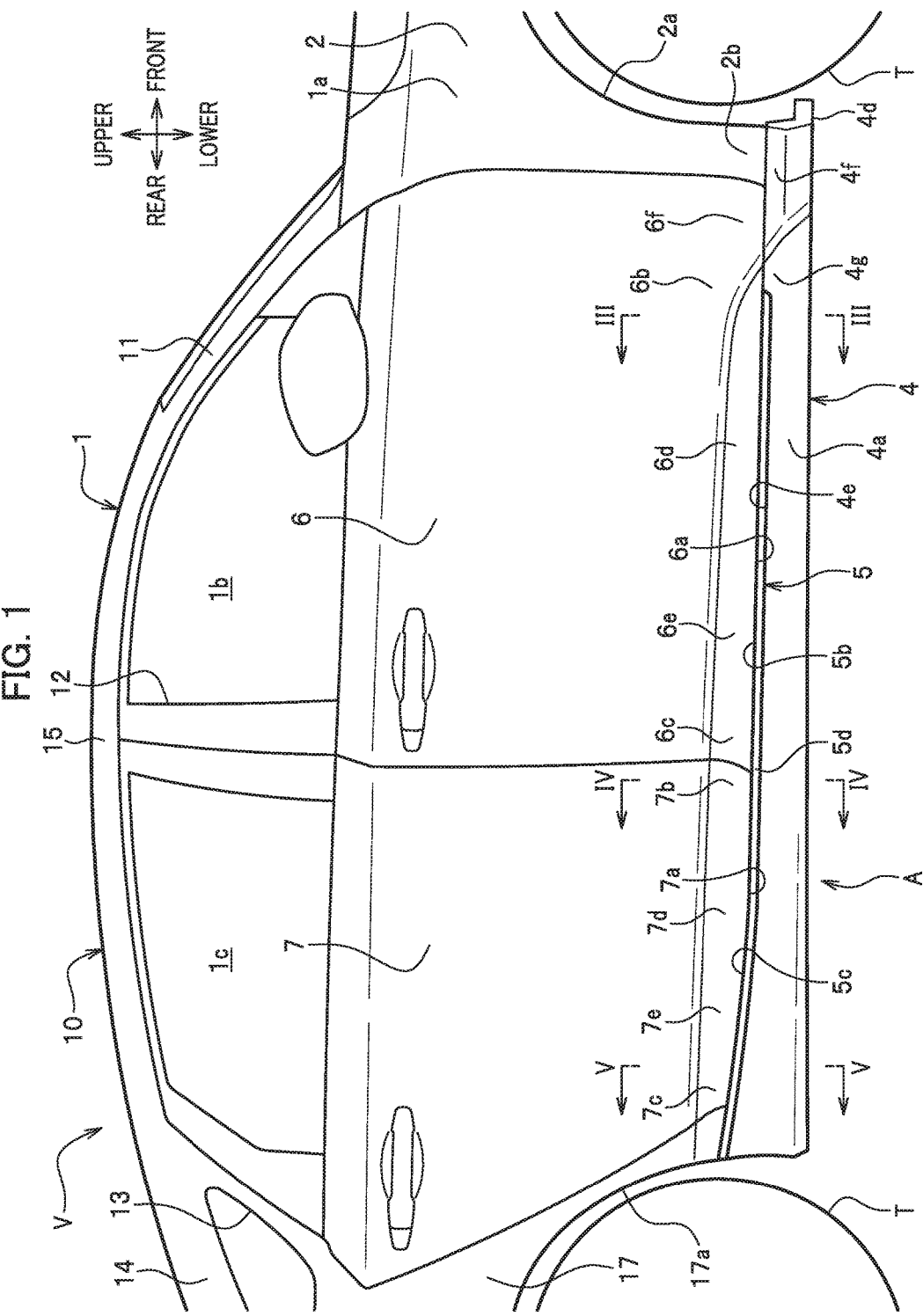
FIG. 1 is a side view of main portions of an exemplary vehicle side structure according to an embodiment of the present invention.

As shown in FIG. 1, the vehicle V is an automobile having, for example, a center pillar 12, a side sill 16, a front door 6 and a rear door 7 arranged on both sides in the longitudinal direction of the center pillar 12. A type, shape and the like of the vehicle V are not especially limited. Hereinafter, an embodiment will be described with a vehicle side body 1a on the right side of the vehicle V having the front door 6, the rear door 7 and the like. Further, since the vehicle side structures A are formed substantially symmetrically on the right side and the left side, the vehicle side structure A on an assistant driver's seat (left) will not be described.

<<Vehicle Side Structure>>

The vehicle side structure A forms the right or left vehicle side body 1a of a vehicle body 1. The vehicle side structure A mainly has an outer panel 10, an inner panel and a reinforcing member (not shown), a front fender 2, the front door 6, the rear door 7, a molding member 5 and a side sill garnish 4.

Figure 2:
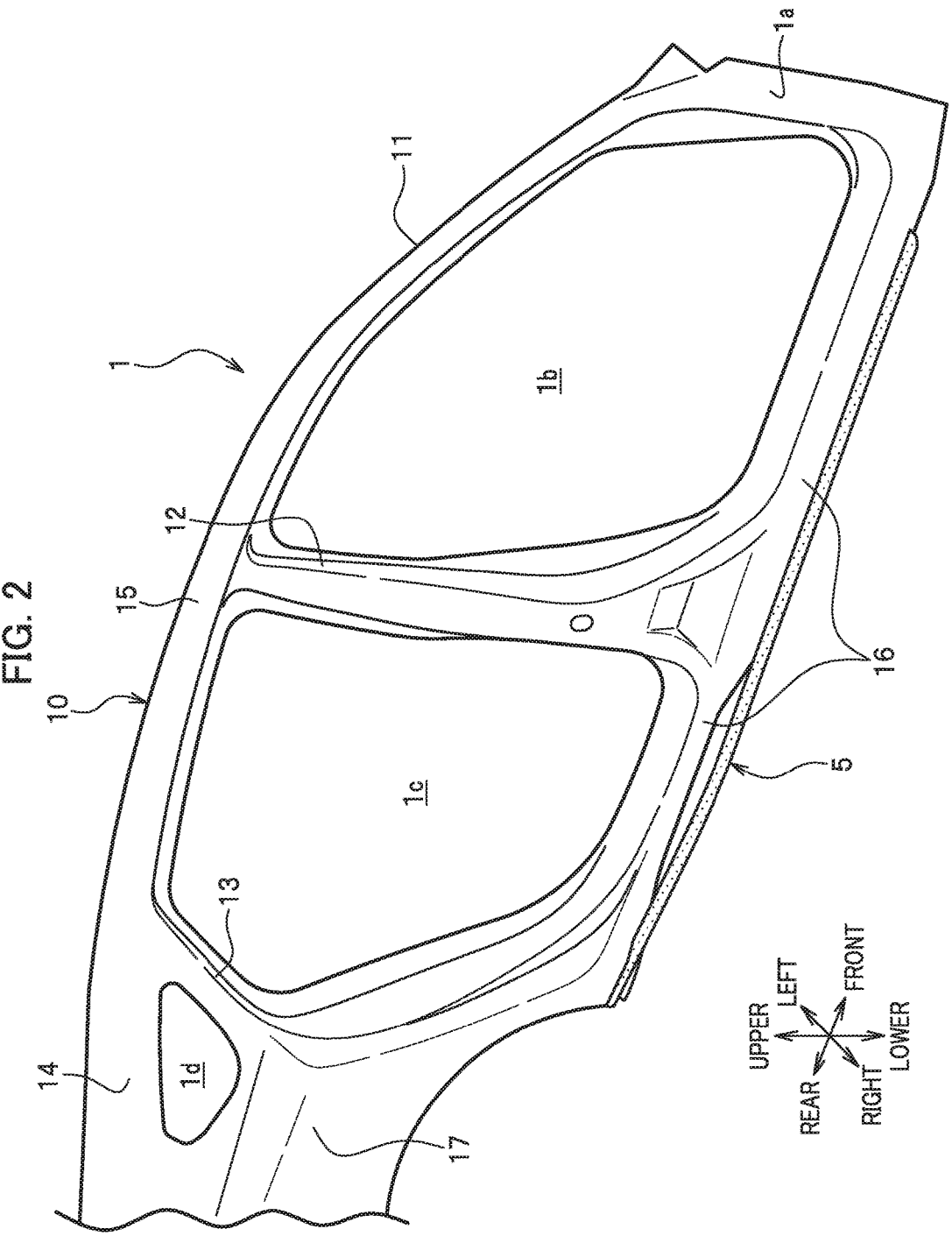
FIG. 2 is a perspective view of an outer panel.

As shown in FIG. 2, the outer panel 10 is made of a high-strength steel plate or the like forming a design surface of the vehicle side body 1a. The inner panel and the like (not shown) are joined to an inside of the outer panel 10. The outer panel 10 is integrally formed to include a front pillar 11, the center pillar 12, a quarter pillar 13, a rear pillar 14, a roof side rail 15, the side sill 16 and a part of a rear fender 17.

Figure 4:
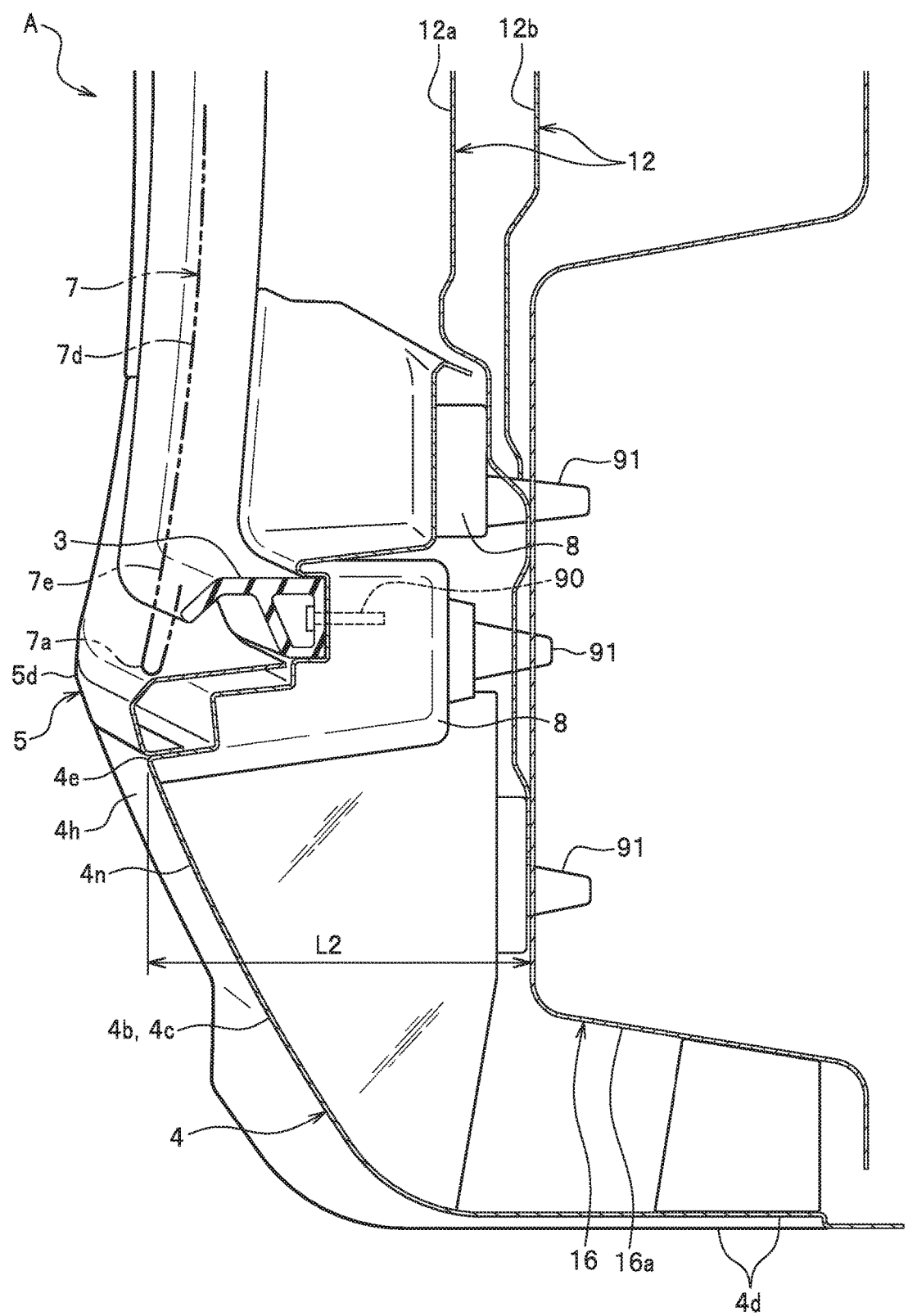
FIG. 4 is an enlarged cross-sectional view taken along a line IV-IV in FIG. 1.

The center pillar 12 extends vertically between the roof side rail 15 and the side sill 16 so as to be arranged between a front door opening 1b that is opened and closed by the front door 6 and a rear door opening 1c that is opened and closed by the rear door 7. As shown in FIG. 4, the center pillar 12 is in a tubular shape formed by joining a pillar outer panel 12a, a stiffener 12b as a reinforcing member and a pillar inner panel (not shown) to define a closed cross section.

The pillar outer panel 12a forms a vehicle exterior portion of the center pillar 12.

The stiffener 12b is made of a high-strength steel plate to improve the strength and rigidity against bending of the center pillar 12. The stiffener 12b is arranged to partition into an inside and an outside the center pillar 12 that is formed in a columnar shape by joining the pillar inner panel (not shown) and the pillar outer panel 12a.

<Side Sill>

Figure 3:
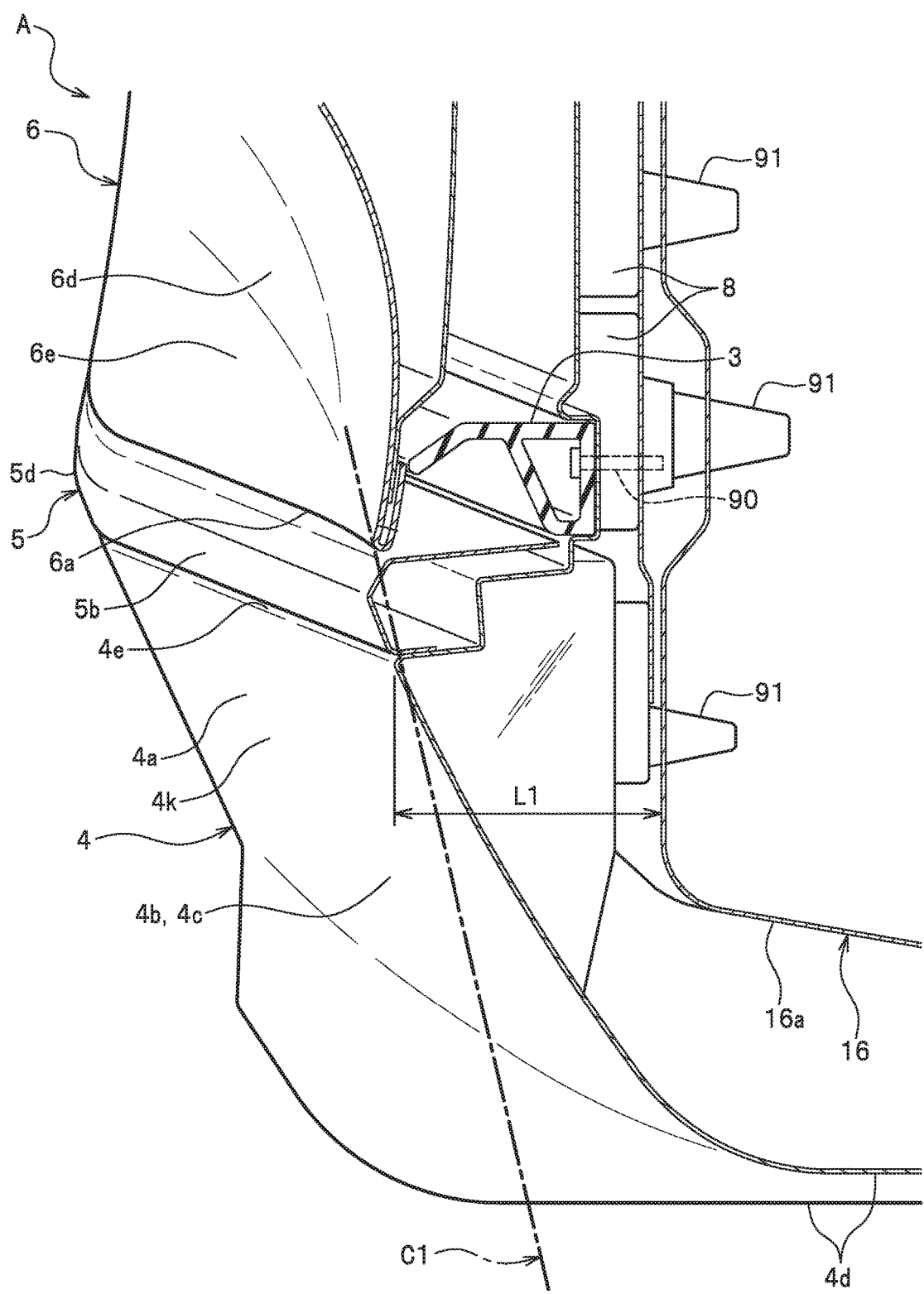
FIG. 3 is an enlarged cross-sectional view taken along a line in FIG. 1.
Figure 5:
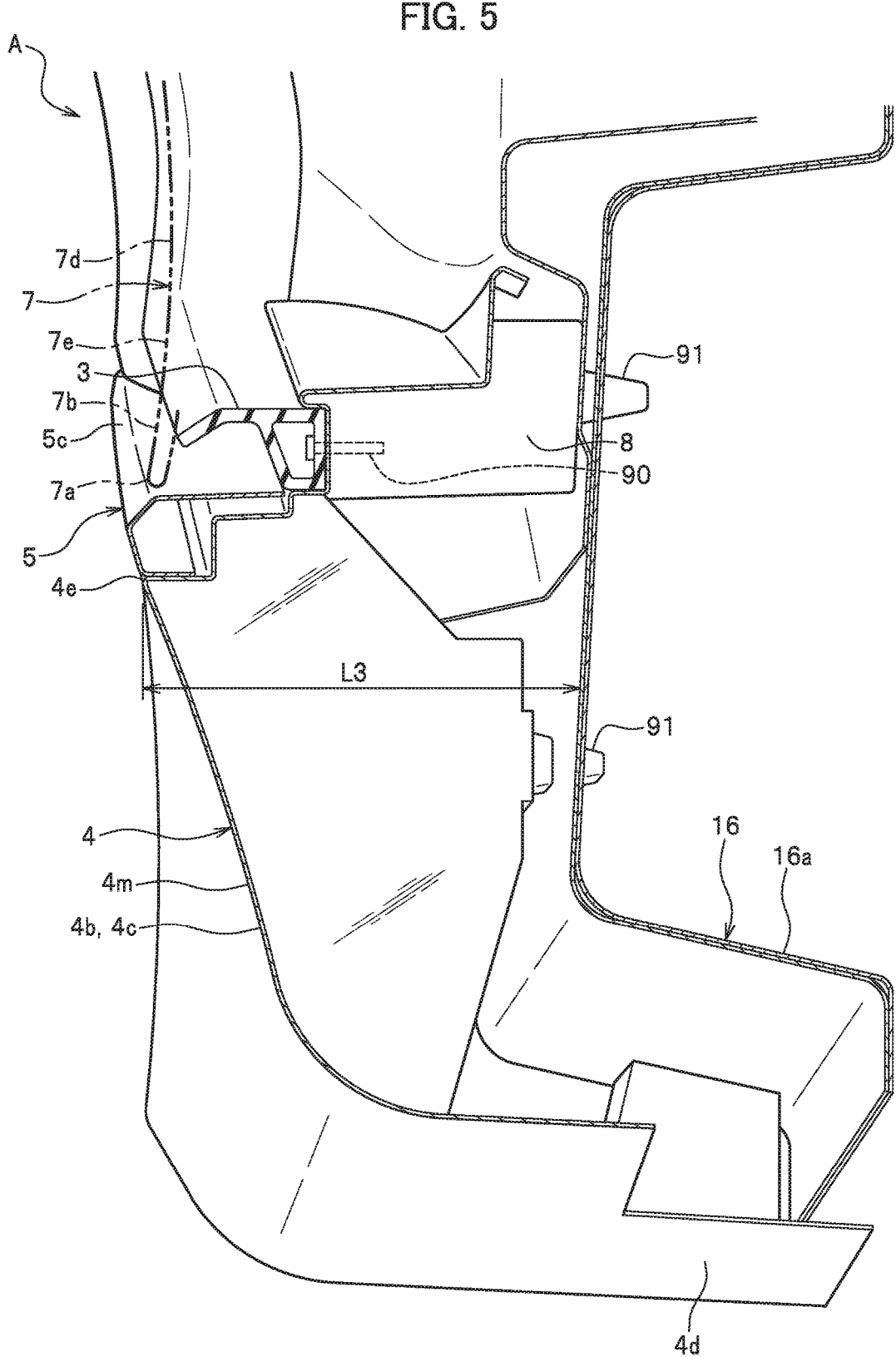
FIG. 5 is an enlarged cross-sectional view taken along a line V-V in FIG. 1.

As shown in FIG. 2, the side sill 16 is arranged under the front door opening 1b and the rear door opening 1c to extend substantially linearly in the longitudinal direction. As shown in FIGS. 3 to 5, the side sill 16 is formed by joining three high-strength steel plates of a side sill outer panel 16a, the stiffener and a side sill inner panel (not shown), to define a vertical cross-section in a plan view having two approximately D-shaped closed cross-sections. As shown in FIG. 4, a center in the longitudinal direction of the side sill 16 is joined orthogonally to the lower end of the center pillar 12. A cross member, a reinforcing bracket (lateral member) (not shown) arranged in the lateral direction, a floor panel and the like are joined to an inside in the lateral direction of the side sill 16.

<Side Sill Garnish>

As shown in FIG. 3, the side sill garnish 4 is a decorative member made of resin that is arranged to cover an exterior in the lateral direction of the side sill 16 so as to protect the side sill 16 from pebbles and the like thrown up while the vehicle is traveling. As shown in FIG. 1, the side sill garnish 4 extends in the longitudinal direction from the lower end of a tire housing 2a formed in the front fender 2 to the lower end of a tire housing 17a formed in the rear fender 17. The side sill garnish 4 is arranged under the front door 6 and the rear door 7 to be fixed to the side sill 16 by a fastening member such as a clip 91 (see FIG. 3).

Figure 6:
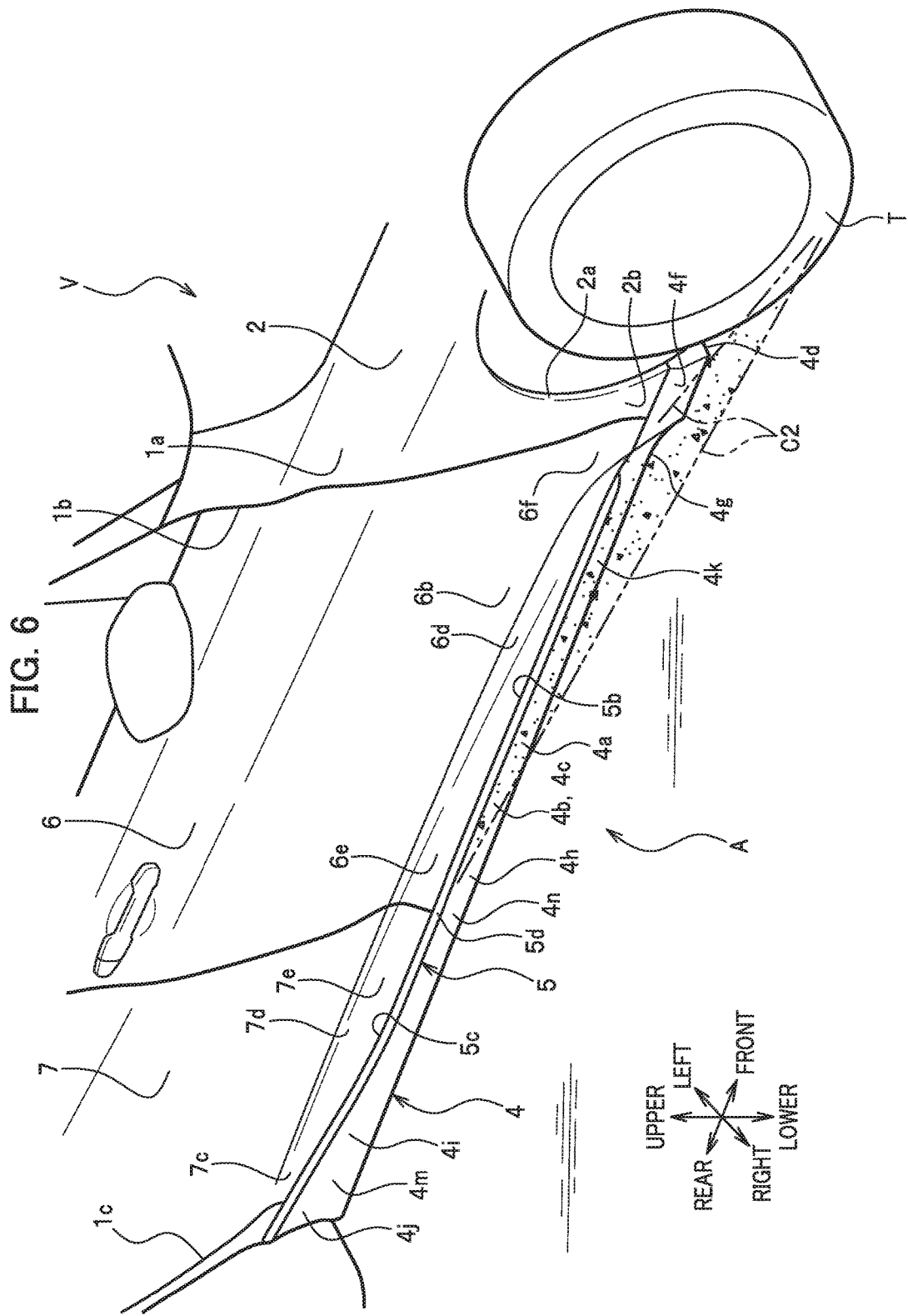
FIG. 6 is an explanatory diagram showing a trajectory of chipping from a front wheel.
Figure 8:
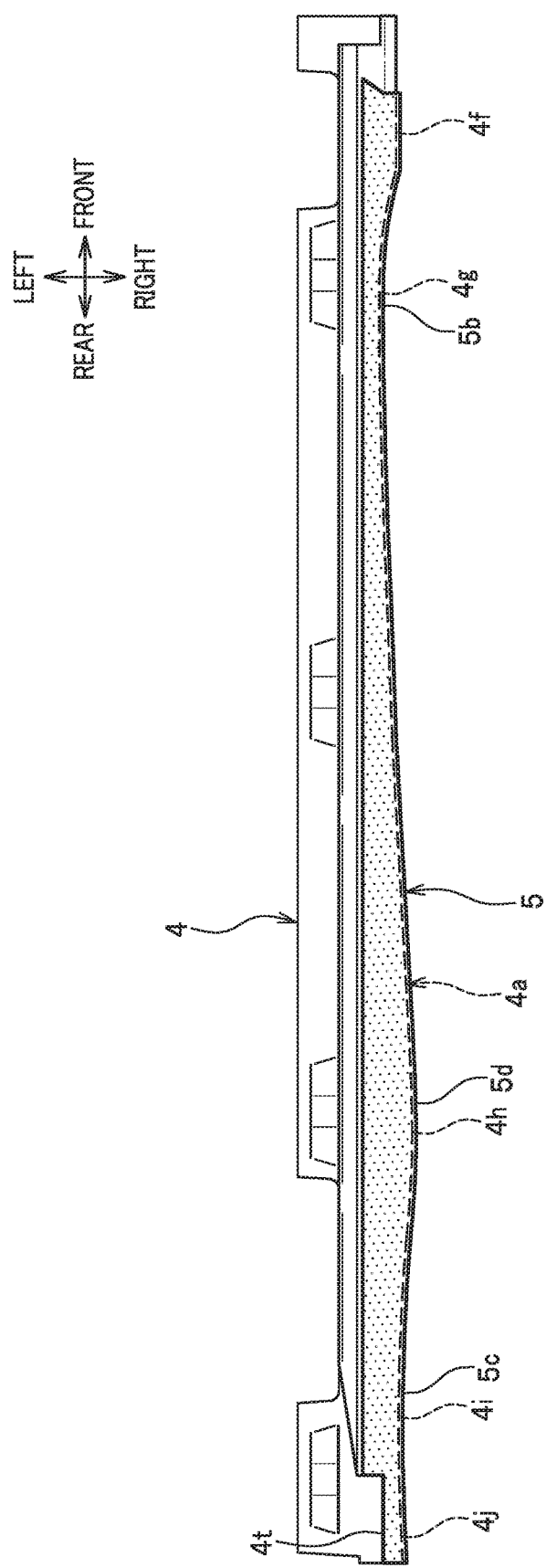
FIG. 8 is a plan view of a side sill garnish and a molding member.

As shown in FIGS. 6 and 8, from the front end to the rear end, a flat portion 4f, a garnish front concave portion 4g, a garnish front convex portion 4h, a garnish rear concave portion 4i and a garnish rear convex portion 4j are sequentially formed on an outer face 4a in the lateral direction of the side sill garnish 4. Therefore, the outer face 4a in the lateral direction of the side sill garnish 4 is formed in a slightly uneven shape outward in the lateral direction in a plan view.

As shown in FIG. 6, the flat portion 4f is formed substantially vertically in accordance with a rear lower end 2b of the tire housing 2a formed in the front fender 2 and a front lower end 6f of the front door 6.

As shown in FIGS. 6 and 8, the garnish front concave portion 4g is formed in a plan view to be recessed inward in the lateral direction with respect to the flat portion 4f. In the side sill garnish 4, the garnish front concave portion 4g is formed in a curved shape so as to be gradually recessed rearward from the rear end of the flat portion 4f and gradually protruded toward the garnish front convex portion 4h. The front end of the garnish front concave portion 4g is formed obliquely rearward from the lower end of the side sill garnish 4 toward an upper end 4e (front end of a door concave portion 6d of the front door 6).

The garnish front convex portion 4h is formed in a plan view to gradually protrude in a curved shape outward in the lateral direction with respect to the garnish front concave portion 4g. The garnish front convex portion 4h is formed outside in the lateral direction of the center pillar 12 (see FIG. 4). Therefore, the garnish front convex portion 4h serves to protect the rear door 7 arranged behind the garnish front convex portion 4h from chippings.

The garnish rear concave portion 4i is formed in a plan view to be recessed inward in the lateral direction with respect to the garnish front convex portion 4h. The garnish rear concave portion 4i is formed between the garnish front convex portion 4h and the garnish rear convex portion 4j.

The garnish rear convex portion 4j is formed in a plan view to protrude outward in the lateral direction with respect to the garnish rear concave portion 4i. The garnish rear convex portion 4j is formed from the rear end of the garnish rear concave portion 4i to the rear end of the side sill garnish 4. As shown in FIG. 8, an outer panel fixing portion 4t is formed on the inner side in the lateral direction of the garnish rear convex portion 4j for fixing the side sill garnish 4 to the outer panel 10.

As shown in FIG. 6, an inclined portion 4b (see FIGS. 3 and 5) that is inclined inward in the lateral direction from the upper side to the lower side is formed in a garnish front portion 4k corresponding to a front portion 6b of the front door 6 and in a garnish rear portion 4m corresponding to a rear portion 7c of the rear door 7, on the outer face 4a in the lateral direction of the side sill garnish 4 outside. In other words, a garnish inclined portion 4c that is inclined upward and outward in the lateral direction is formed outside in the lateral direction of the side sill garnish 4.

As shown in FIGS. 3 to 5, a horizontal face 4d that covers the lower face of the side sill 16 is formed over the entire lower side of the side sill garnish 4 at the lower end of the inclined portion 4b (garnish inclined portion 4c).

Accordingly, distances L1, L2, L3 in the lateral direction between the side sill garnish 4 and the side sill 16 are set such that the distance L2 at a center pillar setting portion 4n (see FIG. 4) where the lower portion of the center pillar 12 is arranged is the longest.

That is, the relationship between the distance L1 in the lateral direction as shown in FIG. 3 between the side sill garnish 4 at the front in the longitudinal direction and the side sill 16, the distance L2 in the lateral direction as shown in FIG. 4 between the side sill garnish 4 at the center in the longitudinal direction and the side sill 16, and the distance L3 in the lateral direction as shown in FIG. 5 between the side sill garnish 4 at the rear in the longitudinal direction and the side sill 16 is as follows:

L2>L3>L1.

Figure 9:
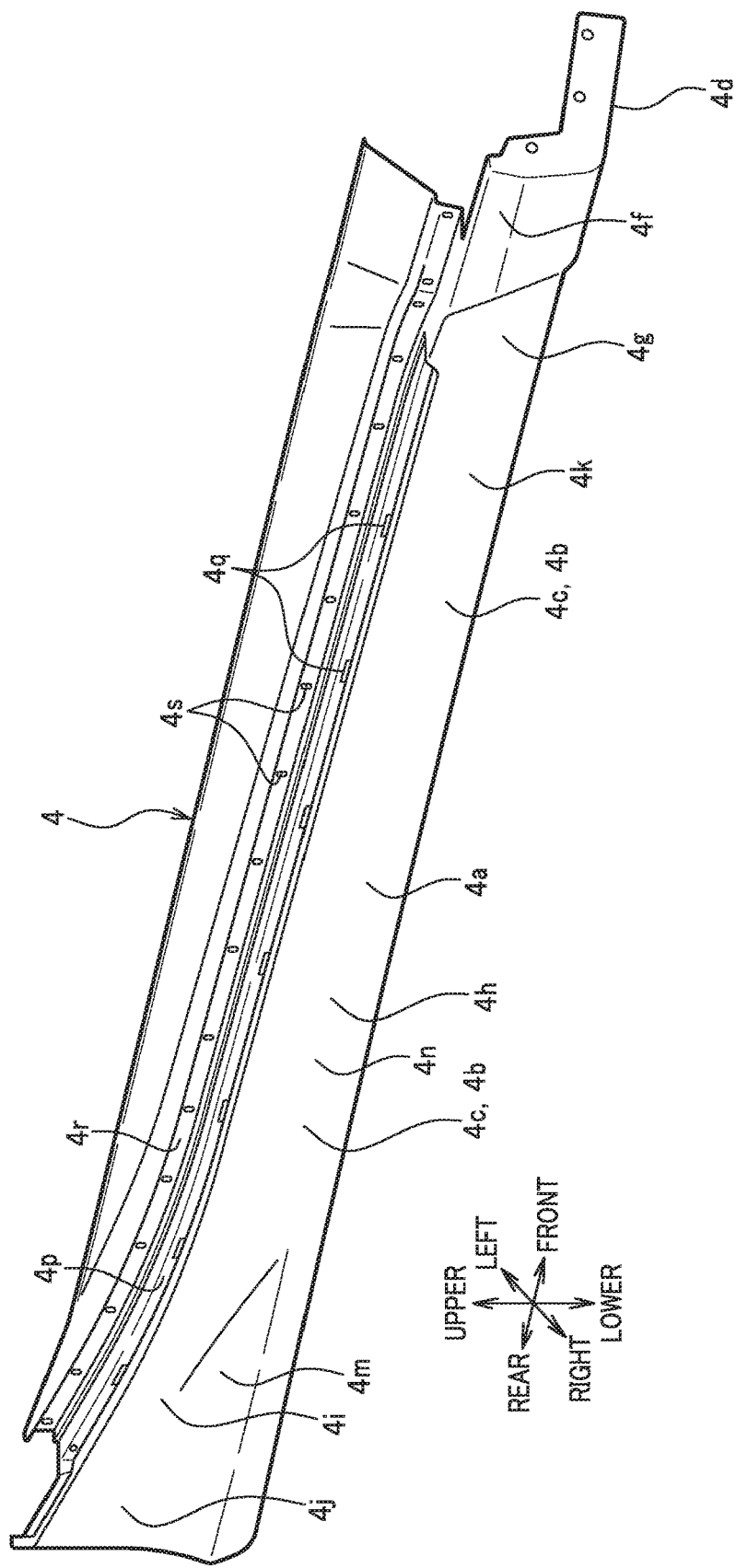
FIG. 9 is a perspective view of the side sill garnish before molding the molding member.
Figure 10:
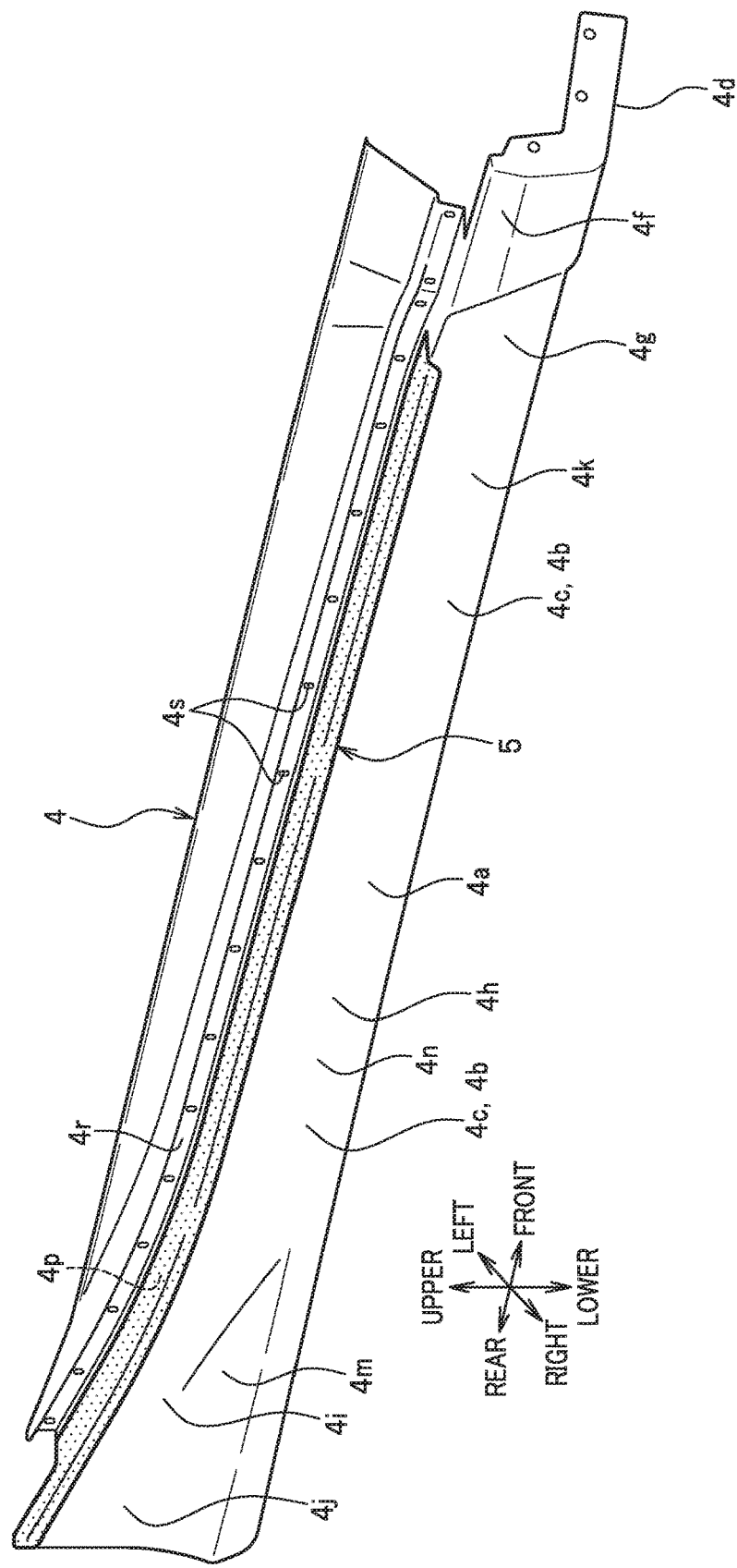
FIG. 10 is a perspective view of the side sill garnish after molding the molding member.

As shown in FIGS. 9 and 10, a molding member mount groove 4p to be mounted with a molding member 5 and a weather strip mount groove 4r to be mounted with a weather strip 3 (see FIG. 3) are formed on the upper portion of the side sill garnish 4 to extend in the longitudinal direction. A plurality of locking holes 4q to be engaged with locking protrusions (not shown) formed on the molding member 5 is formed in the molding member mount groove 4p. A plurality of fastener attachment holes 4s to attach fasteners 90 (see FIG. 3) for fixing the weather strip 3 to the side sill garnish 4 is formed in the weather strip mount groove 4r.

<Molding Member>

As shown in FIGS. 1 and 2, the molding member 5 is arranged outside in the lateral direction of the side sill 16 at the lower ends of the front door opening 1*b* and the rear door opening 1*c*, and is a resin member that extends in the longitudinal direction in a substantially belt shape in a side view. The surface of the molding member 5 is plated.

As shown in FIGS. 3 to 5, the molding member 5 is arranged between lower ends 6*a*, 7*a* of the front door 6 and rear door 7 and the upper end 4*e* of the side sill garnish 4. The side face (outer face) of the molding member 5 protrudes more outside in the lateral direction than the lower ends 6*a*, 7*a* of the front door 6 and rear door 7. Further, the side face of the molding member 5 is arranged more outside in the lateral direction than the garnish inclined portion 4*c* and the door inclined portions 6*e*, 7*e*.

As shown in FIG. 1, the molding member 5 includes, at an outside in the lateral direction, a front door lower portion 5*b* that is arranged under the front portion 6*b* of the front door 6 and a rear door lower portion 5*c* that is arranged under the rear portion 7*c* of the rear door 7. The front door lower portion 5*b* is arranged at the lower opening edge of the front door opening 1*b* that is arranged at the lower end 6*a* of the front door 6. The rear door lower portion 5*c* is arranged at the lower opening edge of the rear door opening 1*c* that is arranged at the lower end 7*a* of the rear door 7. As shown in FIG. 3, the front door lower portion 5*b* and the rear door lower portion 5*c* are recessed more inside in the lateral direction than a center pillar outer portion 5*d* that is arranged outside in the lateral direction of the lower of the center pillar 12.

<Front Door and Rear Door>

As shown in FIG. 1, the front door 6 and the rear door 7 are arranged on both sides in the longitudinal direction of the center pillar 12. Door recesses 6*d*, 7*d* that are recessed inward in the lateral direction are formed at the front portions 6*b*, 7*b* of the front door 6 and rear door 7, respectively.

The front end of the door recess 6*d* in the front door 6 is formed to obliquely run upward and rearward in a curved shape, in accordance with the front end shape of the garnish front concave portion 4*g* formed obliquely rearward from the lower end toward the upper end 4*e* of the side sill garnish 4. The door recess 6*d* extends horizontally from a position slightly rearward with respect to the front lower end of the front door 6 to the rear end.

The door recess 7*d* in the rear door 7 extends horizontally rearward of the vehicle from the rear end of the door recess 6*d* in the front door 6 to the center of the rear door 7, and then, the upper end of the door recess 7*d* extends obliquely slightly upward from the center to the rear portion 7*c* of the rear door 7.

As shown in FIGS. 3 to 5, the door inclined portions 6*e*, 7*e* that are inclined downward and outward in the lateral direction are arranged at the lower of the front door 6 and rear door 7. The molding member 5 is arranged between the door inclined portions 6*e*, 7*e* and the garnish inclined portion 4*c*. The molding member 5 extends in the longitudinal direction along the door recesses 6*d*, 7*d* at the lower of the door recesses 6*d*, 7*d* (see FIGS. 1 and 6).

<Weather Strip>

As shown in FIGS. 3 to 5, the weather strip 3 is a sealing member made of rubber that is arranged on the opening edges (see FIG. 2) of the front door opening 1*b* and the rear door opening 1*c* to prevent entry of rain, dust, noise, and the like. The weather strip 3 is fixed to a reinforcing member 8 via the side sill garnish 4 by fasteners 90 such as pins.

<Reinforcing Member>

As shown in FIGS. 3 and 5, the reinforcing member 8 is arranged between the upper portion of the side sill garnish 4 and the side sill 16, and, as shown in FIG. 4, between the upper portion of the side sill garnish 4 and the center pillar 12. The reinforcing member 8 extends in the longitudinal direction along the side sill garnish 4.

<<Operation of Vehicle Side Structure>>

Next, a description will be given of an operation of the vehicle side structure A according to the embodiment of the present invention with reference to the drawings.

As shown in FIG. 1, the vehicle side structure A of the present invention has the front door 6 and rear door 7 arranged on both sides in the longitudinal direction of the center pillar 12, the side sill 16 arranged under the front door 6 and rear door 7 (see FIGS. 3 to 5), the side sill garnish 4 fixed to the side sill 16, and the molding member 5 that is arranged between the lower ends 6*a*, 7*a* of the front door 6 and rear door 7 and the upper end 4*e* of the side sill garnish 4 and that protrudes more outside in the lateral direction than the lower ends 6*a*, 7*a* of the front door 6 and rear door 7. The molding member 5 includes the front door lower portion 5*b* that is arranged under the front portion 6*b* of the front door 6, the rear door lower portion 5*c* that is arranged under the rear portion 7*b* of the rear door 7, and the center pillar outer portion 5*d* that is arranged outside in the lateral direction of the lower portion of the center pillar 12. The front door lower portion 5*b* and the rear door lower portion 5*c* are recessed more inside in the lateral direction than the center pillar outer portion 5*d*.

For example, in a case where a vehicle structure allows chippings of pebbles or the like thrown up by a front wheel T to directly hit the lower end 6*a* of the front door 6 while the vehicle V is traveling, a chipping trajectory C1 draws a line in a vertical cross-sectional view to connect the lower end of the front door 6 to the outermost end in the lateral direction of the front wheel T (see FIG. 1), as shown in FIG. 3.

In contrast, as shown in FIGS. 3 to 5, the molding member 5 under the front door 6 and rear door 7 is arranged to protrude more outside in the lateral direction than the lower ends of the front door 6 and rear door 7, i.e., chipping trajectory C1.

Therefore, pebbles or the like thrown up by the front wheel T hits the side sill garnish 4 and the molding member 5 to cause the molding member 5 to prevent the pebbles or the like from hitting the lower ends 6*a*, 7*a* of the front door 6 and rear door 7. Accordingly, the vehicle side structure A of the present invention can prevent damage from chippings with a simple structure having the molding member 5 arranged on the side sill garnish 4.

Further, as shown in FIG. 6, while the vehicle V is traveling, a chipping trajectory C2 of pebbles or the like thrown up by the front wheel T draws a line in a side view to connect the lower end of the front wheel T upward and rearward of the vehicle. That is, pebble or the like thrown up by the front wheel T is thrown up toward the side sill garnish 4 and the lower face of the molding member 5.

In this case, as shown in FIG. 4, the center pillar outer portion 5*d* that is arranged outside the center pillar 12 of the molding member 5 is arranged to protrude more outside than the rear door 7. Therefore, the molding member 5 can prevent damage and corrosion of a hem portion at the lower end of the rear door 7 from chippings caused by the front wheel T.

Figure 7:
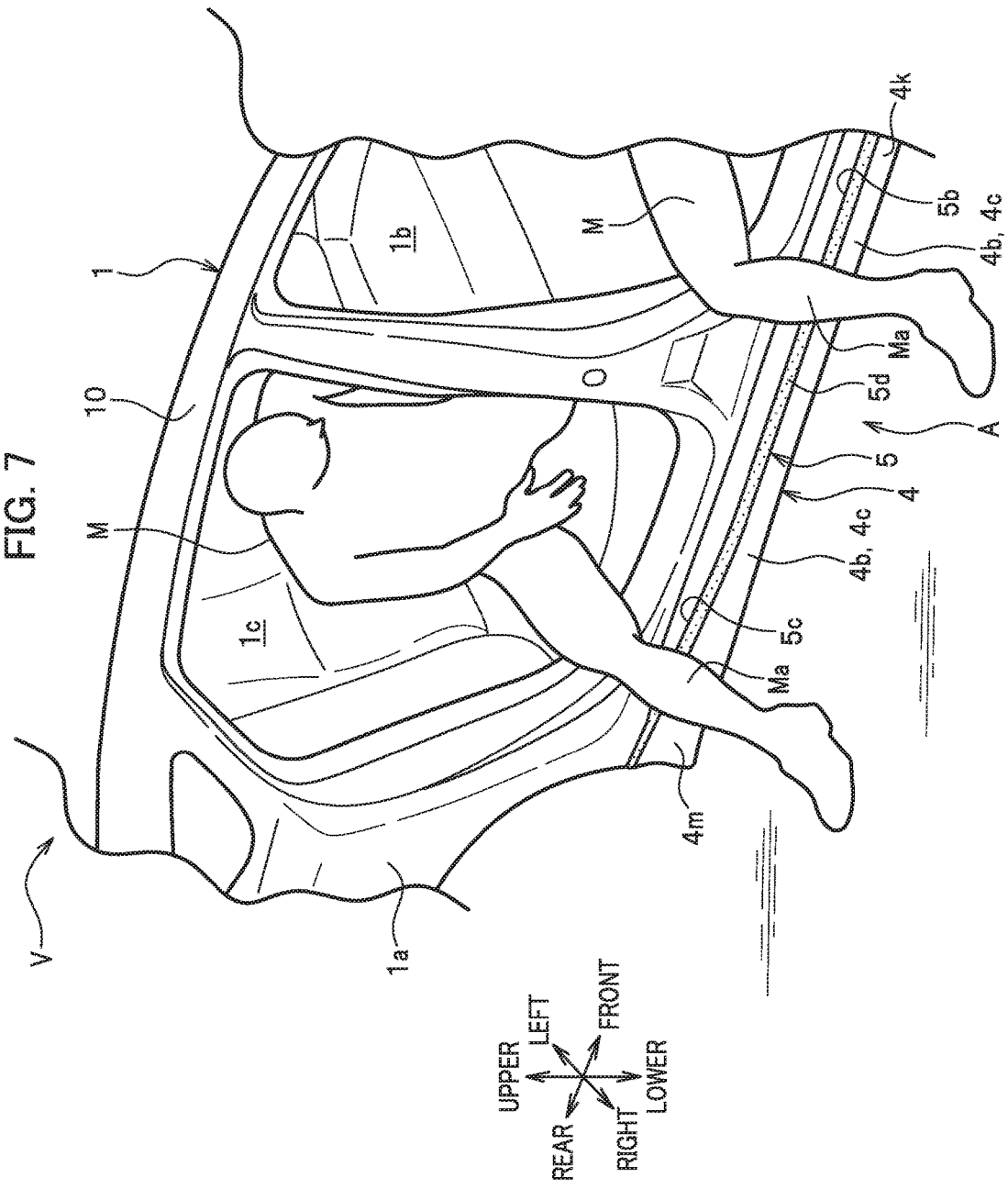
FIG. 7 is a schematic perspective view of main portions without doors or the like when occupants get in and out of the vehicle.

As shown in FIG. 7, the molding member 5 is formed such that the front door lower portion 5*b* (see FIG. 3) and the rear door lower portion 5*c* (see FIG. 5) are recessed more inside in the lateral direction than the center pillar outer portion 5*d*. Therefore, the front door lower portion 5*b* and the rear door lower portion 5c prevent legs Ma of occupants M from being caught by the molding member 5 when the occupants M get in and out of the vehicle V. As shown in FIG. 6, since the center pillar outer portion 5d of the molding member 5 protrudes outward in the lateral direction, the molding member 5 can prevent the lower end of the rear door 7 from being directly hit with chippings caused by the front wheel T, while merchantability in appearance and easiness of getting in and out for the occupants M are maintained. That is, the center pillar outer portion 5d of the molding member 5 prevents the rear door 7 from being hit with chippings. Thus, the lower end of the vehicle side body 1a is designed to satisfy both the easiness of getting in and out and the prevention of chippings.

As shown in FIGS. 3 to 5, the vehicle side structure A has the front door 6 and rear door 7 arranged on both sides in the longitudinal direction of the center pillar 12, and the side sill garnish 4 arranged under the front door 6 and the rear door 7 and fixed to the side sill 16. The side sill garnish 4 includes the garnish inclined portion 4c that inclines upward and outward in the lateral direction. The door inclined portions 6e, 7e inclined downward and outward in the lateral direction are arranged at the lower of the front door 6 and rear door 7. The molding member 5 is arranged between the garnish inclined portion 4c and the door inclined portions 6e, 7e to protrude more outside in the lateral direction than the garnish inclined portion 4c and the door inclined portions 6e, 7e.

As described above, the molding member 5 protrudes more outside in the lateral direction than the garnish inclined portion 4c and the door inclined portions 6e, 7e, to prevent chippings from hitting the lower ends 6a, 7a of the front door 6 and rear door 7.

Further, as shown in FIGS. 3 to 5, the side sill garnish 4 includes the garnish inclined portion 4c that inclines upward and outward in the lateral direction. Therefore, as shown in FIG. 7, the garnish inclined portion 4c hardly comes in contact with the legs Ma of the occupants M who get in and out of the vehicle V, to maintain easiness of getting in and out for the occupants M.

Still further, as shown in FIGS. 3 to 5, the molding member 5 is arranged to protrude at the outermost position in the lateral direction. Therefore, in a case where an obstacle or the like contacts the side face of the vehicle V, the molding member 5 contacts the obstacle or the like, to protect the front door 6 and rear door 7 from the obstacle or the like.

As shown in FIGS. 3 and 5, the side sill garnish 4 includes the garnish front portion 4k corresponding to the front portion 6b of the front door 6 and the garnish rear portion 4m corresponding to the rear portion 7c of the rear door 7. The inclined portion 4b that inclines inward in the lateral direction as it runs downward from the upper portion thereof is arranged on each of the outer faces 4a of the garnish front portion 4k and the garnish rear portion 4m.

Accordingly, as shown in FIG. 7, since the side sill garnish 4 includes the inclined portion 4b that inclines inward in the lateral direction as it runs downward from the upper portion thereof, only the portions necessary to prevent chippings are protruded outward. Therefore, the degree of freedom in design of the vehicle side body 1a is improved. Further, the inclined portions 4b are formed in the garnish front portion 4k and the garnish rear portion 4m, to prevent the legs Ma of the occupants M who get in and out of the vehicle V from contacting the side sill garnish 4, so as to maintain easiness of getting in and out for the occupants M.

As shown in FIGS. 3 to 5, the side sill 16 extends substantially linearly in the longitudinal direction, and the distance L2 at the center pillar setting portion 4n (see FIG. 4) where the lower of the center pillar 12 is arranged is set to be the longest among the distances L1, L2, and L3 in the lateral direction between the side sill garnish 4 and the side sill 16.

Thus, the side sill 16 extends substantially linearly in the longitudinal direction to have the structure similar to the conventional one. The side sill garnish 4 and the molding member 5 that are arranged outside in the lateral direction of the side sill 16 are made of resin having good moldability, so as to be easily formed into members in a shape capable of preventing chippings. Further, since the center pillar setting portion 4n (see FIG. 4) of the side sill garnish 4 is arranged to protrude to an outermost position in the lateral direction, a collision stroke is kept at the time of side collision.

As shown in FIG. 6, the door recess 6d that is recessed inward in the lateral direction is formed in the longitudinal direction at the lower end 6a of the front door 6, and the molding member 5 is arranged under the door recess 6a.

In general, in a case where the door recess 6d is formed in the front door 6 by design of the vehicle V, doors will likely to be hit with chippings caused by the front wheel T. In contrast, since the vehicle side structure A of the present invention has the molding member 5 under the door recess 6d, the front door 6 and rear door 7 are protected from chippings.

[Modification]

It should be noted that the present invention is not limited to the above-described embodiments, and various modifications and changes can be applied within the scope of the technical ideas thereof, and the present invention obviously extends to those modified or altered inventions.

For example, the side sill garnish 4 and the molding member 5 made of resin has been described as an example, but the material is not particularly limited and may be made of metal.

Further, the molding member 5 may be attached to the lower ends 6a, 7a of the front door 6 and rear door 7. In this manner, chippings of pebbles or the like are more reliably prevented from hitting the lower ends 6a, 7a of the front door 6 and rear door 7.

Still further, the front door 6 and rear door 7 can be any side doors arranged on the vehicle side body 1a, and may be slide doors or gull wing doors.

What is claimed is:

1. A vehicle side structure comprising:
   a front door and a rear door that are arranged on both sides in a longitudinal direction of a center pillar;
   a side sill that is arranged under the front door and the rear door;
   a side sill garnish that is fixed to the side sill; and
   a molding member that is arranged between lower ends of the front door and the rear door and an upper end of the side sill garnish, and that protrudes more outside in a lateral direction than lower ends of the front door and the rear door,
   wherein the molding member includes:
      a front door lower portion that is arranged under a front portion of the front door;
      a rear door lower portion that is arranged under a rear portion of the rear door; and
      a center pillar outer portion that is arranged outside in the lateral direction of a lower portion of the center pillar, and wherein the front door lower portion and the rear door lower portion are recessed more inside in the lateral direction than the center pillar outer portion.

2. The vehicle side structure according to claim 1, wherein the side sill garnish includes a garnish front portion that corresponds to the front portion of the front door and a garnish rear portion that corresponds to the rear portion of the rear door, and wherein an inclined portion that inclines inward in the lateral direction as the inclined portion runs downward from an upper side thereof is arranged on each of outer faces of the garnish front portion and the garnish rear portion.

3. The vehicle side structure according to claim 1, wherein the side sill extends substantially linearly in the longitudinal direction, and a distance at a center pillar setting portion where the lower portion of the center pillar is arranged is set to be the longest among distances in the lateral direction between the side sill garnish and the side sill.

4. The vehicle side structure according to claim 2, wherein the side sill extends substantially linearly in the longitudinal direction, and a distance at a center pillar setting portion where the lower portion of the center pillar is arranged is set to be the longest among distances in the lateral direction between the side sill garnish and the side sill.

5. The vehicle side structure according claim 1, wherein a door recess that is recessed inward in the lateral direction is arranged in the longitudinal direction at the lower end of the front door, and the molding member is arranged under the door recess.

6. The vehicle side structure according claim 2, wherein a door recess that is recessed inward in the lateral direction is arranged in the longitudinal direction at the lower end of the front door, and the molding member is arranged under the door recess.

7. The vehicle side structure according claim 3, wherein a door recess that is recessed inward in the lateral direction is arranged in the longitudinal direction at the lower end of the front door, and the molding member is arranged under the door recess.

8. The vehicle side structure according claim 4, wherein a door recess that is recessed inward in the lateral direction is arranged in the longitudinal direction at the lower end of the front door, and the molding member is arranged under the door recess.

9. The vehicle side structure comprising:

a front door and a rear door that are arranged on both sides in a longitudinal direction of a center pillar; and a side sill garnish that is arranged under the front door and the rear door and fixed to a side sill, wherein the side sill garnish includes a side sill garnish inclined portion that inclines upward and outward in a lateral direction, a door inclined portion that inclines outward and downward in the lateral direction is arranged at lower portions of the front door and the rear door, wherein a molding member is arranged between the side sill garnish inclined portion and the door inclined portion, and the molding member is arranged more outside in the lateral direction than the side sill garnish inclined portion and the door inclined portion.

* * * * *